United States Patent [19]

Berger et al.

[11] Patent Number: 4,566,836
[45] Date of Patent: Jan. 28, 1986

[54] APPARATUS FOR HANDLING PACKED GOODS

[75] Inventors: Maurice Berger, Cortaillod; Jean-Francois Bernasconi, Collombier; Michel R. Juillerat, Neuchatel, all of Switzerland

[73] Assignee: Fabriques de Tabac Reunies, S.A., Neuchatel, Switzerland

[21] Appl. No.: 743,888

[22] Filed: Jun. 12, 1985

Related U.S. Application Data

[63] Continuation of Ser. No. 477,295, Mar. 21, 1983, abandoned.

[30] Foreign Application Priority Data

Mar. 31, 1982 [EP] European Pat. Off. ........ 82810144.4

[51] Int. Cl.$^4$ ...................... B65G 57/04; B65G 57/22
[52] U.S. Cl. ........................................ 414/57; 414/71; 414/72; 901/16
[58] Field of Search .................... 414/57, 70, 71, 72, 414/77, 532; 198/631, 779, 780, 788, 789; 901/16

[56] References Cited

U.S. PATENT DOCUMENTS

| | | | |
|---|---|---|---|
| 3,780,884 | 12/1973 | Jones | 414/121 X |
| 3,884,363 | 5/1975 | Ajlouny | 414/71 X |
| 3,888,362 | 6/1975 | Fletcher et al. | 901/16 X |
| 3,955,688 | 5/1976 | Jones | 414/71 |
| 4,005,782 | 2/1977 | Crockett | 901/16 X |
| 4,229,136 | 10/1980 | Panissidi | 901/16 X |
| 4,242,025 | 12/1980 | Thibault | 414/70 |
| 4,339,030 | 7/1982 | Hirata | 198/779 |

FOREIGN PATENT DOCUMENTS

| | | | |
|---|---|---|---|
| 0059477 | 9/1982 | European Pat. Off. . | |
| 2152392 | 4/1973 | Fed. Rep. of Germany | 414/71 |
| 2363030 | 5/1980 | Fed. Rep. of Germany . | |
| 2454987 | 12/1980 | France | 414/71 |
| 52-59475 | 5/1977 | Japan | 414/71 |
| 1571893 | 7/1980 | United Kingdom . | |

Primary Examiner—Leslie J. Paperner
Attorney, Agent, or Firm—Jeffrey H. Ingerman

[57] ABSTRACT

Apparatus for gripping cases of cigarettes from a casing machine and for stacking the cases on a pallet including two fixed and vertical uprights to guide the movements of a bridge which is cantilevered in front of the uprights and which is movable in the vertical direction along these uprights. A suction-cup is rotatable about a vertical axis and is mounted on a carriage movable transversely on a slide which is movable longitudinally on the bridge. The cases of cigarettes are put onto a roller train which moves forward so that each case reaches a presentation position where the suction-cup seizes it. Position sensors detect the presence of a pallet under the bridge and control the movements of the suction-cup so as to distribute the cases in several successive layers on the pallet.

10 Claims, 2 Drawing Figures

APPARATUS FOR HANDLING PACKED GOODS

This is a continuation of application Ser. No. 477,295, filed Mar. 21, 1983, entitled APPARATUS FOR HANDLING PACKED GOODS, now abandoned.

BACKGROUND OF THE INVENTION

The present invention relates to an apparatus for handling packed goods and in particular to an apparatus for stacking boxes of cigarette cartons.

In the cigarette manufacturing industry, automated machinery is used to make the cigarettes, to assemble a number of cigarettes, generally twenty, into a pack to assemble a certain number of packs of cigarettes, generally ten, into a carton, to assemble a predetermined number of cartons of cigarettes, into parallelepiped-shaped assemblages, to insert each of these assemblages into a packing case, to close the end flaps of these cases, seal them, and check them. At this point in the operation, however, the cases are transferred by hand from the automated apparatus to a shipping pallet and arranged in a number of stacks on the pallet.

Accordingly, there is a need in the art to extend the automation of these various operations by providing apparatus for handling the cases of cigarettes and arranging them on standard pallets for shipping.

SUMMARY OF THE INVENTION

The present invention alleviates to a great extent the shortcomings of the prior art by providing a packed goods handling device including movable gripping means for seizing a package situated in a presentation position, means, associated with a bridge supporting the gripping member, for guiding and for driving this member, the bridge being movable vertically, a retractable presentation device for supporting a package and for bringing it into the presentation position, the latter being situated under the bridge, and an automatic control device acting upon said driving means and including position sensors, the latter being adapted to detect the presence of a pallet at a loading location situated under the bridge, the control device adapted to initiate successive movements of the gripping member to dispose packages successively seized in the presentation position on a pallet present at the loading location according to a predetermined arrangement.

A preferred embodiment of the invention will be described below, with reference to the accompanying drawings in which:

DETAILED DESCRIPTION OF THE PREFERRED EMBODIMENT

Figure 1:
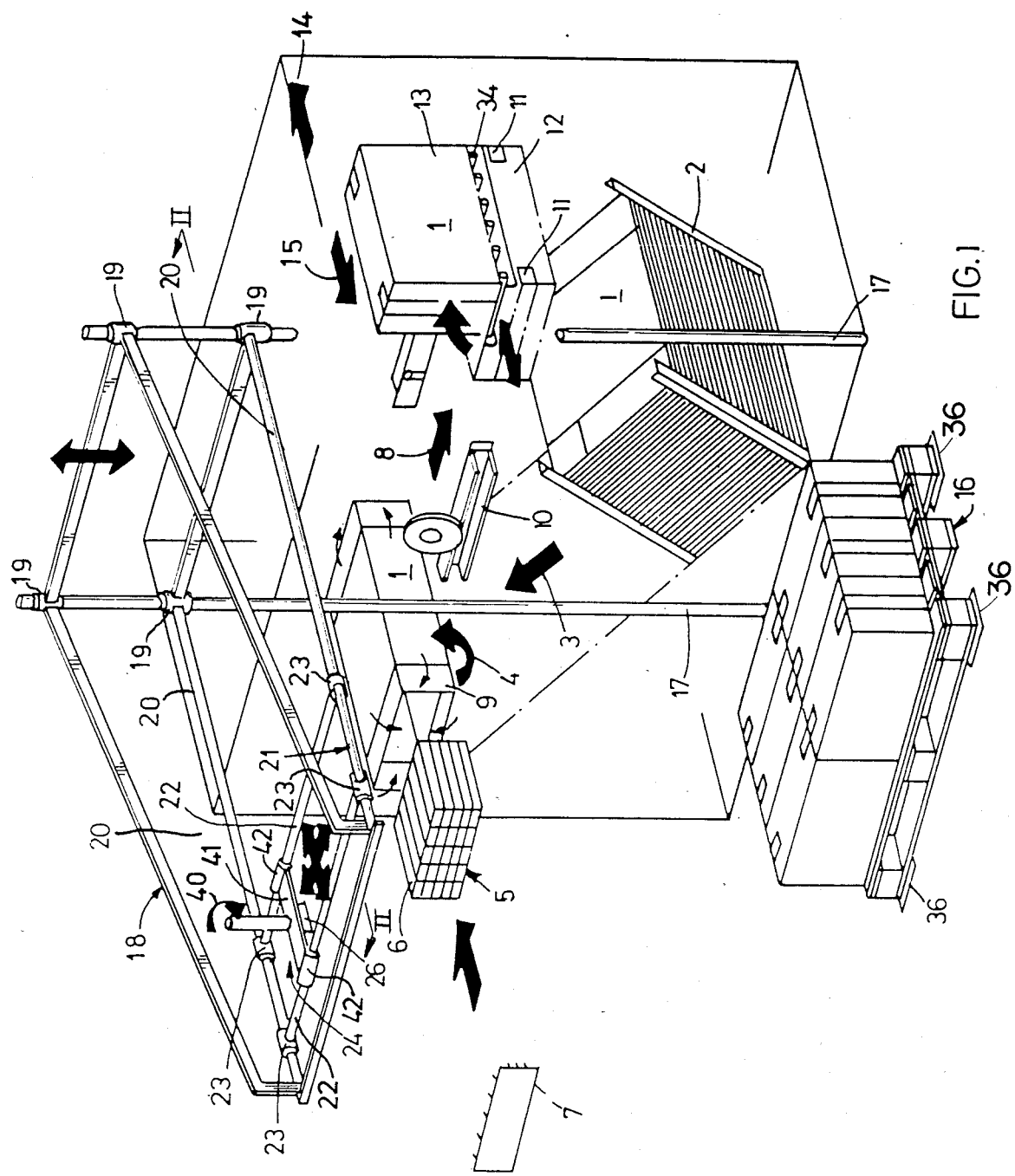
FIG. 1 is a schematic perspective view showing the general layout of the handling device according to the present invention; and, FIG. 2 is a view, taken along line II—II of FIG. 1.

One of the salient features of the preferred embodiment of the present invention shown in FIG. 1 is that its dimensions are such that it is positionable closely adjacent to existing automated apparatus for filling and closing cases 1 of cigarettes. The pertinent operation of this existing automated apparatus is typically as follows. Cardboard cases 1, folded flat are stacked between four obliquely disposed angle iron rails 2. Placed beneath this stack is a conveyor of any known type (not shown) capable of moving the cases obliquely upward one by one in the direction indicated by arrow 3. At this location, folded cases 1 are unfolded by means of suction-grip members (not shown). Case 1 thereafter pivots as shown by arrow 4 into a horizontal filling position and receives a stack 5 of twenty-five cartons 6 of packs of cigarettes. Carton 6 is stacked directly at the exit of the packing apparatus and checked by means of a pusher 7 equipped with feelers for checking the proper filling of the case. If one or more cartons are missing, the apparatus generates a signal, for example, by means of a opto-acoustic device, and moves the case in a rearward position as indicated by arrow 14, in the process by-passing sealing device 10. If no cartons are missing, pusher 7 pushes stack 5 into case 1 disposed in a filling position. Flaps 9 of case 1 are then closed by hinged paddles (not shown). Thereafter, case 1 moves horizontally as shown by arrow 8 and passes in front of device 10 for sealing the case flaps with self-adhesive tape. Each case of cigarettes then arrives at reception position 12 and is seized by a swing device (not shown) which turns it ninety degrees and brings it into exit position 13. Thereafter, case 1 is moved forward, in the direction indicated by arrow 15, by means to be described below.

As may be seen in the drawings, the whole of the apparatus described up to now occupies a space in the shape of a right parallelepiped which is a little wider than the length of each case 1.

Prior to the present invention, cases 1 reaching position 13 were taken by hand and arranged on a standard pallet 16 brought up in front of the box-closing installation by a conveying means. However, it has been found that the parallelepiped-shaped space occupied by this installation is of appreciably greater dimension than a pallet, so that, even if the stacks of cartons 5 are inserted from the same side as that where the pallets are situated, the space above the pallets remains completely free. This finding has made it possible to conceive an automatic handling apparatus which can be mounted in a position directly adjacent to the filling installation without hindering any of the other already automated operations. For example, stacks 5 may be introduced into cardboard cases 1 either from the front, as shown in FIG. 1 or as a variation, from the rear without affecting the operation of the present invention.

The handling apparatus according to the present invention includes two fixed uprights 17, preferably made from cylindrical metal bars. On these bars, there slides a bridge 18 made from a rigid structure provided with four guide couplings 19 fitted by pairs on bars 17. Bridge 18 is cantilevered toward the front in such a way that it can move vertically on the uprights 17. Bridge 18 is driven up and down by any known means, e.g., by equipping the bridge with an electric motor, the pinion of the horizontal shaft of which engages a vertical rack. Alternatively, pulley-and-cable systems, or jack systems may also be employed.

Bridge 18 includes two horizontal guide rails 20 positioned perpendicular to the plane defined by cylindrical bar uprights 17 which are long enough to permit the arrangement of cases 1 on pallet 16, as will be described below. Slide 21, including two parallel guide bars 22 interconnected and provided with guide couplings 23 at the ends thereof, is guided by bars 20 to effect longitudinally movement of slide 21 on bridge 18. The two transverse bars 22 further serve as guide means for a carriage 24 including flat plate 41 equipped with two bearings 41, one at each of its ends, each of bearings 42 being fitted on a corresponding one of bars 22. Finally, the carriage 24 supports a gripping member including suction cup 26 disposed under carriage 24 and support and control elements shown in more detail in FIG. 2. Also illustrated in FIG. 2 are various drive means for moving suction cup 26 essentially anywhere in the space occupied by bridge 18 in the course of its vertical movements.

Figure 2:
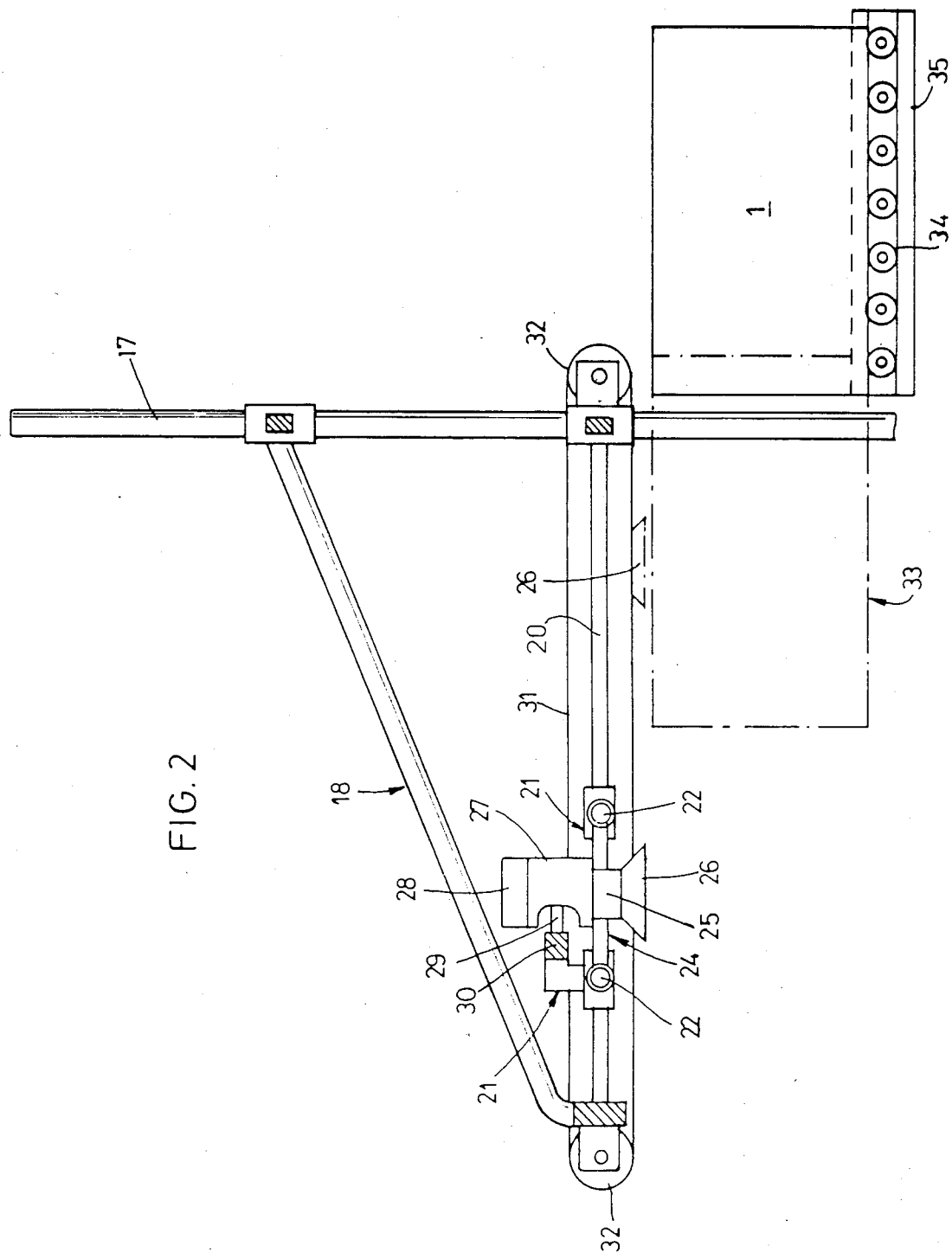

Refer now to FIG. 2, wherein is shown in section one of uprights 17, bridge 18, slide 21, guide bars 22, and carriage 24. Suction-cup 26 is connected to suction means (not shown) which may comprise flexible tubes leading from the base 25 of the suction-cup 26 to a suction pump. Base 25 is rigidly fixed to the bed of carriage 24 and, in the example shown, supports the stators of two motors designated 27 and 28. The shaft of motor 28 is vertically disposed and connected to suction-cup 26 (see arrow 40, FIG. 1) about its vertical axis. Motor 27 includes pinion 29 which engages transverse rack 30 mounted on slide 21. Of course, any alternate drive means ensuring the movement of carriage 24 along bars 22 such as hydraulic or pneumatic jacks may be substituted. To effect movement of slide 21 along guide bars 20 of bridge 18, chain 31 is mounted on two pullsys 32 at the two ends of bridge 18 as shown in FIG. 2 and is fixed by its two ends to slide 21, and one of pulleys 32 is controlled by a motor (not shown). The movement of slide 21 may easily be controlled electrically.

To situate case 1 at the presentation location 33 in FIG. 2, roller train 34 is mounted between two pairs of guide rails 35 having a U-shaped cross-section, disposed horizontally and fitted over the two ends of rollers 34. Rollers 34 are driven by a motor (not shown) and roll on the lower part of rails 35, which are positioned parallel to the longitudinal direction of bridge 18 and behind uprights 17. Roller train 34 will be at least as long as case 1. Referring again to FIG. 1, it will be seen that roller train 34, when in the position shown, defines the exit position 13. If the check is positive, the rollers 34 are driven so as to roll forward in rails 35. Rollers 34 are supporting case 1, and propel it forward at a speed double that of the roller train and thus it reaches position 33, where suction-cup 26 seizes case 1 by its upper surface. In this operation, roller train 34 moves over only half of its own length. After case 1, in position 33, is seized by suction-cup 26, roller train 34 is returned to its starting position, leaving the space under bridge 18 completely free.

To enable automatic loading of pallet 16, it suffices to combine the handling apparatus described with position sensors capable of detecting the presence of pallet 16 and with a programmable control device, e.g. a microprocessor acting upon the motors of the drive means previously described. Thus, in FIG. 1, there are shown position sensor contacts 36 including small, movable plates disposed at floor level, which make contact when the corners of a pallet 16 rest upon them. The control device may be arranged so that the closing of the four contacts 36 initiates a predetermined program of successive movements of suction-cup 26, as well as of turning its suction means on and off. The suction-cup is thus automatically moved to successively engage cases 1 each successively placed in the presentation position and successively disposed each case 1 onto pallet 16, distributing them one beside the other on pallet 16 and then forming successive layers. The program may be such that the orientations of the cases alternate from one layer to the next. In FIG. 1, the dimensions of the cases shown are such that six cases, disposed in two rows of three cases each, occupy the entire surface of a pallet; other arrangements are possible, however.

The control device includes the electronic circuits, as well as the checking elements of pusher 7 and the contacts necessary to ensure that the operations to be effected are carried out completely and precisely. Thus, limit contacts and intermediate contacts (not shown) are placed along bars 22 and 20 so that the position of carriage 24 can be determined at any given moment to monitor the operations. The program for carrying out the operations may be modified as need be by using the known means of the technology of electronics.

The above description and drawings are only illustrative of a preferred embodiment which achieves the objects, features and advantages of the present invention and it is not intended that the present invention be limited thereto. Any modification of the present invention which comes within the spirit and scope of the following claims is considered part of the present invention.

What is claimed as new and desired to be secured by Letters Patent of the United States is:

1. Apparatus for handling a plurality of packages, said apparatus comprising:
   gripping means for individually gripping one of said plurality of packages situated in a presentation position;
   support means for supporting said gripping means, said support means including:
   fixed upright means,
   a bridge adapted for vertical movement on said upright means,
   a movable rig adapted for movement on said bridge in a longitudinal direction, and
   a carriage adapted for movement on said movable rig in a transverse direction;
   a free space between said bridge and a floor level under said bridge;
   drive means for driving said carriage, said movable rig, and said bridge;
   presentation means adapted for supporting a single one of said packages and for bringing said supported package from a checking position situated not under said bridge into a presentation position situated within said free space, said presentation means including a roller train movable at a first speed to convey said package being supported thereby at a second speed to said presentation position, said second speed being greater than said first speed; and
   control means for controlling said gripping means, said drive means, and said presentation means to successively grip packages situated in said presentation position, drive said gripping means, and dispose said packages in successive layers according to a predetermined arrangement on a pallet located at a loading location on said floor in said free space.

2. Apparatus as in claim 1 wherein said gripping means includes a suction-cup adapted to seize a package by its horizontal upper face, and is mounted on said carriage and is rotatable about a vertical axis.

3. Apparatus as in claim 2 wherein the dimensions of said bridge are sufficient for the gripping means to sweep the entire extent of the top surface of a standard pallet present at the loading location.

4. Apparatus as in claim 1 wherein there are two of said fixed upright means and said bridge is cantilevered above the loading location from said upright means.

5. Apparatus as in claim 4 wherein said bridge is cantilevered on one side of a vertical plane defined by said two fixed upright means, said checking position is located on the other side of said plane between said upright means, and said roller train is guided to displace packages perpendicularly to said plane.

6. Apparatus as in claim 1 wherein said roller train includes a plurality of driven rollers, said package being supported thereby, and said presentation means including a pair of U-shaped rails fitted over respective ends of said plurality of driven rollers.

7. Apparatus as in claim 6 wherein said rails are situated outside said free space and oriented such that the roller train is extendable into said free space over a length equal to at least half that of said package.

8. Apparatus as in claim 1 wherein said control means is automatic and successively grips and disposes said packages according to a predetermined arrangement.

9. Apparatus as in claim 8 wherein said control means include sensing means for detecting the position of said pallet at said loading location under said bridge.

10. Appartus as in claim 9 wherein said sensing means includes position sensors positioned to detect the position of said pallet, said sensors including positioning stops and electrical contacts in electrical communication with the control means.

* * * * *